(12) United States Patent
Hishida et al.

(10) Patent No.: US 10,507,956 B2
(45) Date of Patent: Dec. 17, 2019

(54) LID MECHANISM

(71) Applicant: TOYODA GOSEI CO., LTD., Kiyosu-shi, Aichi-ken (JP)

(72) Inventors: Yu Hishida, Kiyosu (JP); Yasufumi Ike, Nagoya (JP); Hirotaka Hori, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 345 days.

(21) Appl. No.: 15/682,841

(22) Filed: Aug. 22, 2017

(65) Prior Publication Data

US 2018/0086514 A1 Mar. 29, 2018

(30) Foreign Application Priority Data

Sep. 28, 2016 (JP) ................. 2016-190415

(51) Int. Cl.
| | |
|---|---|
| *B65D 43/16* | (2006.01) |
| *B65D 43/22* | (2006.01) |
| *E05B 83/32* | (2014.01) |
| *B60R 7/04* | (2006.01) |
| *B60R 13/00* | (2006.01) |

(52) U.S. Cl.
CPC ............. *B65D 43/16* (2013.01); *B65D 43/22* (2013.01); *E05B 83/32* (2013.01); *B60R 7/04* (2013.01); *B60R 13/00* (2013.01)

(58) Field of Classification Search
CPC ...... B65D 43/16; B65D 43/161; B65D 43/22; B65D 43/24; B65D 43/14; B65D 51/00; E05C 17/00; E05B 83/32; B60R 7/04; B60R 7/043; B60R 7/046; B60R 7/06; B60R 7/00; B60R 13/00; B60R 13/013; B60R 13/015; B60R 2011/0007; E05D 15/50
USPC ............................................ 292/163
See application file for complete search history.

(56) References Cited

U.S. PATENT DOCUMENTS

| | | | |
|---|---|---|---|
| 8,100,453 B2* | 1/2012 | Shimajiri | B60R 7/04 296/37.8 |
| 9,415,910 B2* | 8/2016 | Fukui | B60R 7/04 |
| 9,637,060 B2* | 5/2017 | Gaudig | B60R 7/06 |
| 2010/0050380 A1* | 3/2010 | Fujiwara | B60R 7/04 16/242 |

(Continued)

FOREIGN PATENT DOCUMENTS

JP 2016-112979 A 6/2016

*Primary Examiner* — Shawn M Braden
(74) *Attorney, Agent, or Firm* — Posz Law Group, PLC

(57) ABSTRACT

A lid mechanism includes: a box main body; a lid; a locking element that includes a rod and a rod biasing member; and a flap element that includes a flap main body and a flap biasing member and a box contact portion which is configured to come into contact with the box main body, wherein: when the state of the lid changes from the closed state to the opened state, the pressing inclined surface provided in the rod contact portion of the flap main body presses the pressure receiving inclined surface provided in the rod; and when the state of the lid changes from the opened state to the closed state, the box contact portion of the flap main body comes into contact with the box main body such that the pressing of the pressing inclined surface to the pressure receiving inclined surface is released.

4 Claims, 6 Drawing Sheets

(56) References Cited

U.S. PATENT DOCUMENTS

2016/0114732 A1* 4/2016 Sawada ............... B60R 7/04
224/400

* cited by examiner

LID MECHANISM

CROSS-REFERENCE TO RELATED APPLICATION(S)

This application is based upon and claims the benefit of priority from Japanese Patent Application No. 2016-190415, filed on Sep. 28, 2016, the entire contents of which are incorporated herein by reference.

BACKGROUND

1. Field of the Invention

The present invention relates to a lid mechanism in which a lid is openable with respect to a box main body, the lid mechanism being applied to a storage box such as a console box.

2. Description of the Related Art

In the related art, as a storage box for a vehicle such as a console box, a storage box is known in which an opening formed in a box main body is openable by a lid that pivots with respect to the box main body. In this storage box, a locking element that maintains a state where the lid is closed with respect to the box main body is provided. Various locking elements are known, and one of the locking elements is formed of a bolt lock pin.

The locking element formed of a bolt lock pin includes: two rods that are provided at end portions of a lid; a synchronization element that synchronizes movements of the two rods in a direction in which the two rods move toward or away from each other; and a biasing member that biases the two rods in the direction in which the two rods move away from each other. The state of the locking element changes between a locked state where the lid is locked to the box main body and an unlocked state where the lid can pivot with respect to the box main body.

In the locking element in the locked state, the two rods move in the direction away from each other, and a tip of each of the rods protrudes from the lid. The tip of each of the rods protruding from the lid engages with an engaging hole of the box main body. In the locking element in the unlocked state, the two rods move in the direction toward each other, and the tip of each of the rods is stored in the lid. The tip of each of the rods is separated from the box main body (engagement between the tip of each of the rods and the engaging hole is released).

When the lid is in the opened state, the locking element is in the state where the tip of each of the rods protrudes from the lid, that is, in the locked state. The reason for this is that the biasing member of the locking element biases the two rods in the direction in which the two rods move away from each other. When the lid is in the opened state, the tip of each of the rods protrudes from the lid. When the lid changes from the opened state to the closed state, the tip of each of the rods protruding from the lid comes into contact with the box main body. Due to this contact, a contact sound may be generated, or the tips of the rods cannot engage with the engaging holes, respectively, and the lid may not cover the box main body (the lid may not be locked to the box main body).

In a technique disclosed in JP-A-2016-112979, a flap element that restricts a tip of an opened-side rod in a locking element from protruding from a lid when the lid is in the opened state is provided. The flap element disclosed in JP-A-2016-112979 includes a flap main body and a flap biasing member that biases the flap main body. The flap main body is supported by the lid so as to be tilted in a seesaw manner, in which a rod contact portion that restricts the tip of the rod from protruding from the lid is provided on one end side, and a box contact portion that protrudes from the lid and can come into contact with the box main body is provided on the other side. The flap element is disposed below the rod, and the flap biasing member biases the flap main body in a direction in which the rod contact portion rises. The lid disclosed in JP-A-2016-112979 is a double-opening type, in which the locking element is provided on each of opposite end sides of the lid, and the flap element is also provided on each of the opposite end sides so as to engage with the locking element.

When the lid is in the opened state, the open-side rod contact portion of the flap main body is disposed on a near side of a movement locus in a direction in which the tip of the rod protrudes from the lid, and comes into contact with the rod so as to restrict the movement of the rod. As a result, the flap element can restrict the tip of the rod from protruding from the lid. In addition, when the lid is in the closed state, the box contact portion of the flap main body is pressed up by the box main body, and thus the rod contact portion is pressed down. At this time, the rod contact portion deviates from the movement locus of the rod, the restriction of the movement of the rod is released, and the protruding of the tip of the rod from the lid is allowed.

The box contact portion of the flap main body protrudes from the lid so as to come into contact with the box main body. Therefore, when the lid is in opened state, the box contact portion may be pressed due to, for example, a misoperation of the operator. In a case where the box contact portion is pressed, the restriction of the movement of the rod, which is performed by the flap element in the opened state of the lid, is released, and the tip of the rod protrudes from the lid. When the state of the lid changes from the opened state to the closed state without the operator recognizing the misoperation, the tip of the rod protruding from the lid comes into contact with the box main body. Therefore, a contact sound is generated due to the contact. In addition, the tip of the rod cannot engage with the engaging hole provided in the box main body, and the lid may not cover the box main body (the lid may not be locked to the box main body). Therefore, in the flap element disclosed in JP-A-2016-112979, similarly, a contact sound may be generated due to the contact between the tip of the rod and the box main body, or the lid may not be locked to the box main body.

SUMMARY

The invention has been made in consideration of the above-described circumstances, and an object thereof is to provide a lid mechanism in which a contact sound, which may be generated when the state of a lid changes from an opened state to a closed state, is reduced and in which the lid can be reliably locked to a box main body.

According to an aspect of the invention, there is provided a lid mechanism including: a box main body that includes a storage portion having an opening; a lid that is supported so as to pivot with respect to the box main body and a state of which changes between a closed state where the opening is closed and an opened state where the opening is opened; a locking element that includes a rod and a rod biasing member and locks the lid in the closed state to the box main body, the rod being provided in the lid, being changeable between a locked state where the rod engages with the box main body and an unlocked state where engagement between the rod and the box main body is released, and having a pressure receiving inclined surface, and the rod biasing member biasing the rod to enter into the locked state; and a flap element that includes a flap main body and a flap biasing member and, in the opened state, restricts a state of the rod from changing from the unlocked state to the locked state, the flap main body being provided in the lid and including a rod contact portion, which has a pressing inclined surface configured to come into contact with the pressure receiving inclined surface, and a box contact portion which is configured to come into contact with the box main body, and the flap biasing member biasing the flap main body in a direction in which the pressing inclined surface presses the pressure receiving inclined surface of the rod and having a higher biasing force than the rod biasing member, wherein: when the state of the lid changes from the closed state to the opened state, the pressing inclined surface provided in the rod contact portion of the flap main body presses the pressure receiving inclined surface provided in the rod; and when the state of the lid changes from the opened state to the closed state, the box contact portion of the flap main body comes into contact with the box main body such that the pressing of the pressing inclined surface to the pressure receiving inclined surface is released.

The lid mechanism according to the invention includes: the rod biasing member that biases the rod to enter into the locked state; and the flap biasing member that biases the flap main body (rod contact portion) in the direction in which the pressing inclined surface of the flap main body presses the pressure receiving inclined surface of the rod, that is, biases the flat main body such that the rod enters into the unlocked state. In addition, the biasing force of the flap biasing member is higher than that of the rod biasing member.

In the lid mechanism according to the invention, the pressure receiving inclined surface is provided in the rod of the locking element, and the pressing inclined surface is provided in the rod contact portion of the flap main body of the flap element that can come into contact with the rod. The inclined surfaces (the pressing inclined surface and the pressure receiving inclined surface) facing each other are provided on the contact surfaces of the flap main body and the rod, respectively, that can come into contact with each other. Accordingly, in the lid mechanism according to the invention, when the pressing inclined surface of the flap main body comes into contact with the pressure receiving inclined surface of the rod, the pressing force of the flap main body generated by the biasing force of the flap biasing member can be effectively converted into pressing force in the moving direction of the rod. That is, in the lid mechanism according to the invention, interrelation between the flap element and the rod can be improved.

In the lid mechanism according to the invention, the biasing force of the flap biasing member is higher than that of the rod biasing member. Accordingly, when the flap element and the rod come into contact with each other, the flap element presses against the rod, the pressing force of the flap element generated by the biasing force of the flap biasing member is higher than that of the rod generated by the biasing force of the rod biasing member, and thus the flap element can press and move the rod. With the above-described configuration, when no force is applied to the box contact portion of the flap main body, the flap element can press and move the rod such that the rod enters into the unlocked state.

In a case where the operator presses the box contact portion of the flap main body by mistake in the opened state of the lid, the pressing of the flap element to the rod is released, and the rod moves due to the biasing force of the rod biasing member such that the tip of the rod protrudes from the lid. Even in this case, in the lid mechanism according to the invention, the flap main body can press and move the rod according to the biasing force of the flap biasing member after the misoperation is canceled. That is, the flap element moves the rod such that the rod enters into the unlocked state, and the tip of the rod can be stored in the lid. Accordingly, the lid mechanism according to the invention has an advantageous effect in that, even in a case where the misoperation occurs, a contact sound which may be generated when the state of the lid changes from the opened state to the closed state can be effectively suppressed, and the lid can be reliably locked to the box main body.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
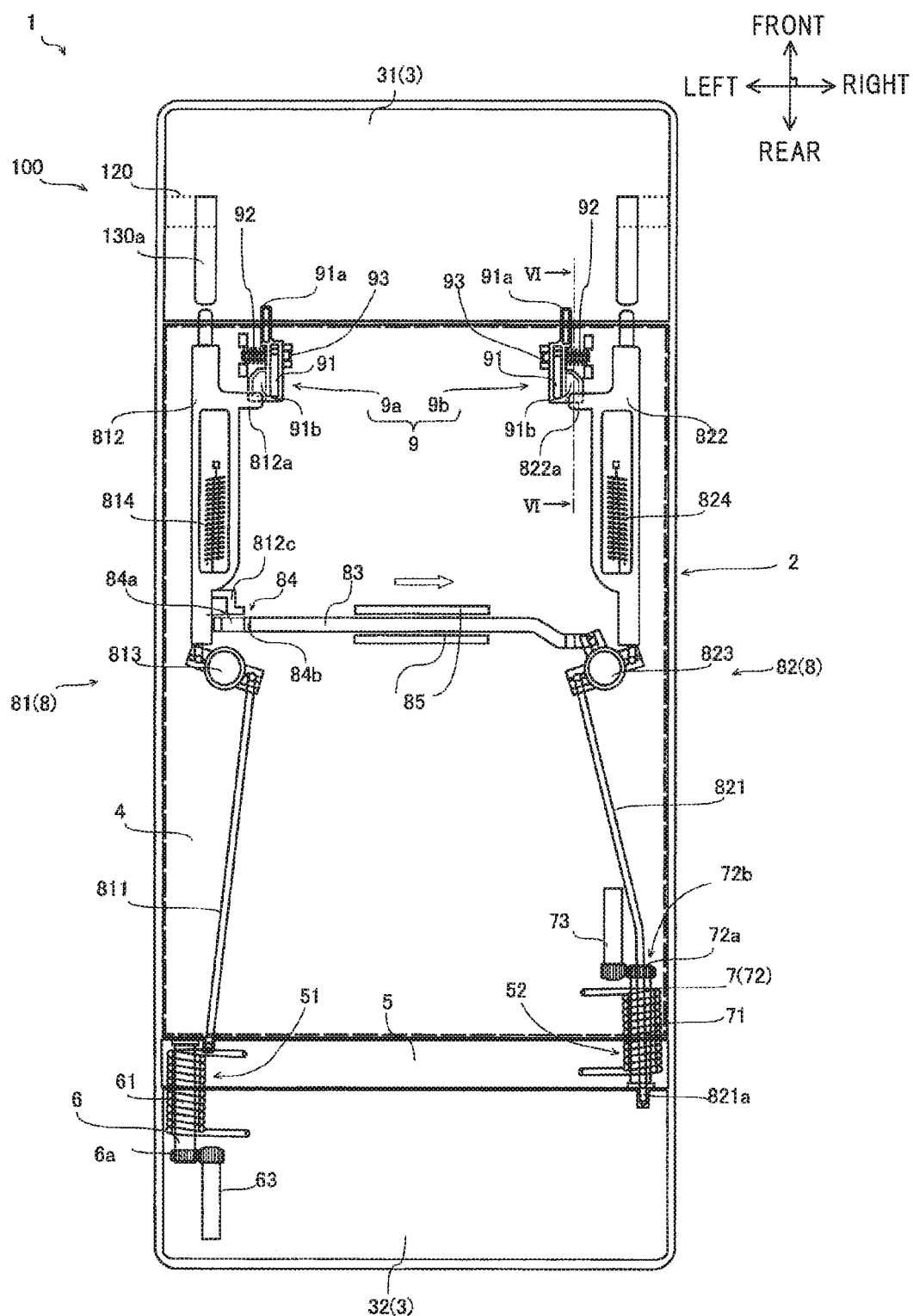
FIG. 1 is a diagram illustrating a lid mechanism according to an embodiment.

Hereinafter, a lid mechanism 1 according to a preferred embodiment of the invention will be described with reference to FIGS. 1 to 8. In FIGS. 1 to 8, "front", "rear", "left", "right". "up", and "down" are directions with respect to a traveling direction of a vehicle. Here, in the accompanying drawings, the same components are represented by the same reference numerals, and the description thereof will not be repeated. The embodiment of the invention is described as the best mode for practicing the invention, and the invention is not limited thereto. In addition, matters necessary to practice this invention other than those specifically referred to in this description may be understood as design matters based on the related art in the pertinent field for a person of ordinary skills in the art. The invention can be practiced based on the contents disclosed in this specification and common technical knowledge in the pertinent field.

Figure 2:
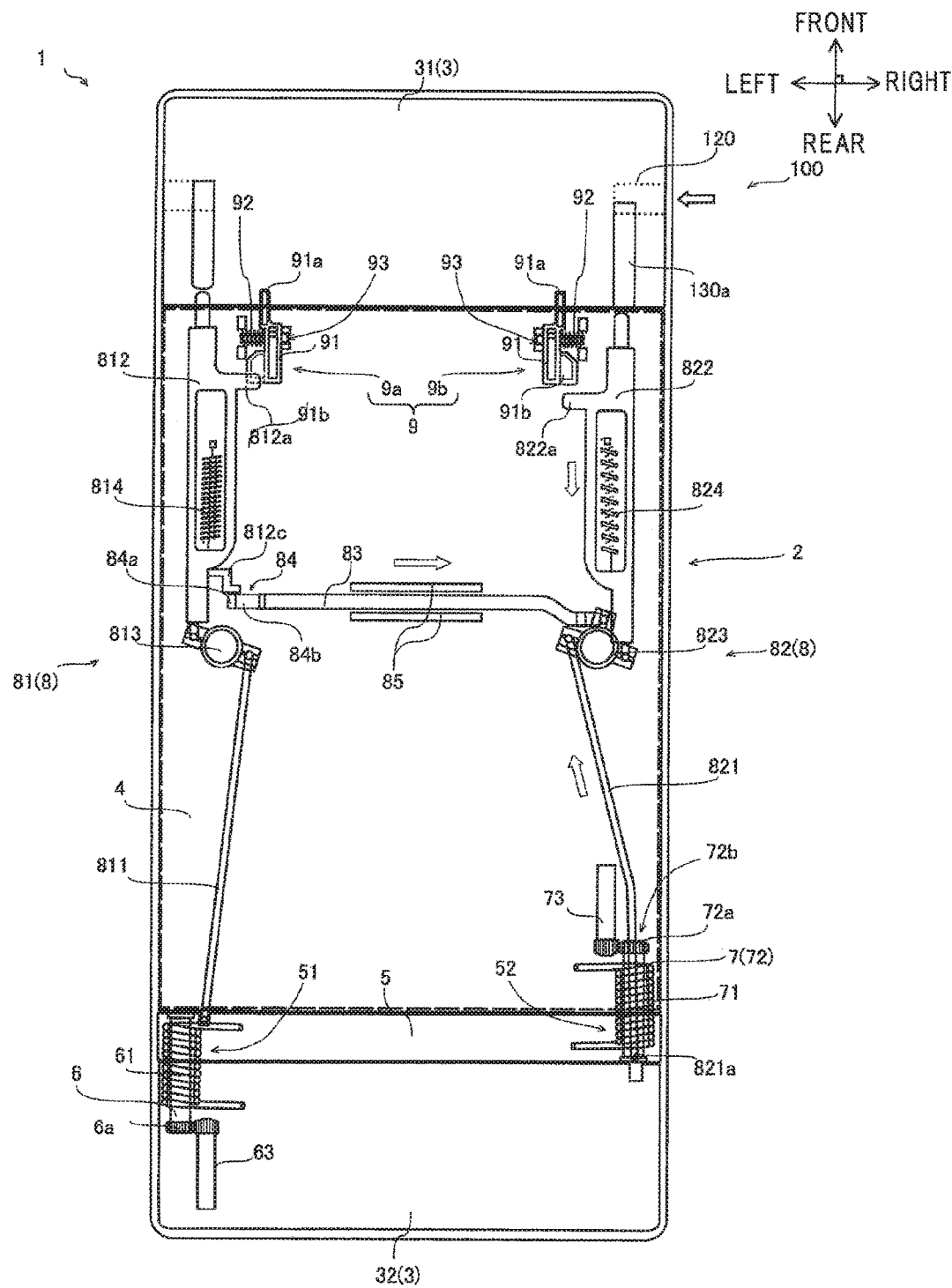
FIG. 2 is a diagram illustrating the lid mechanism according to the embodiment in order to describe an action of a locking element in a first opened state.
Figure 3:
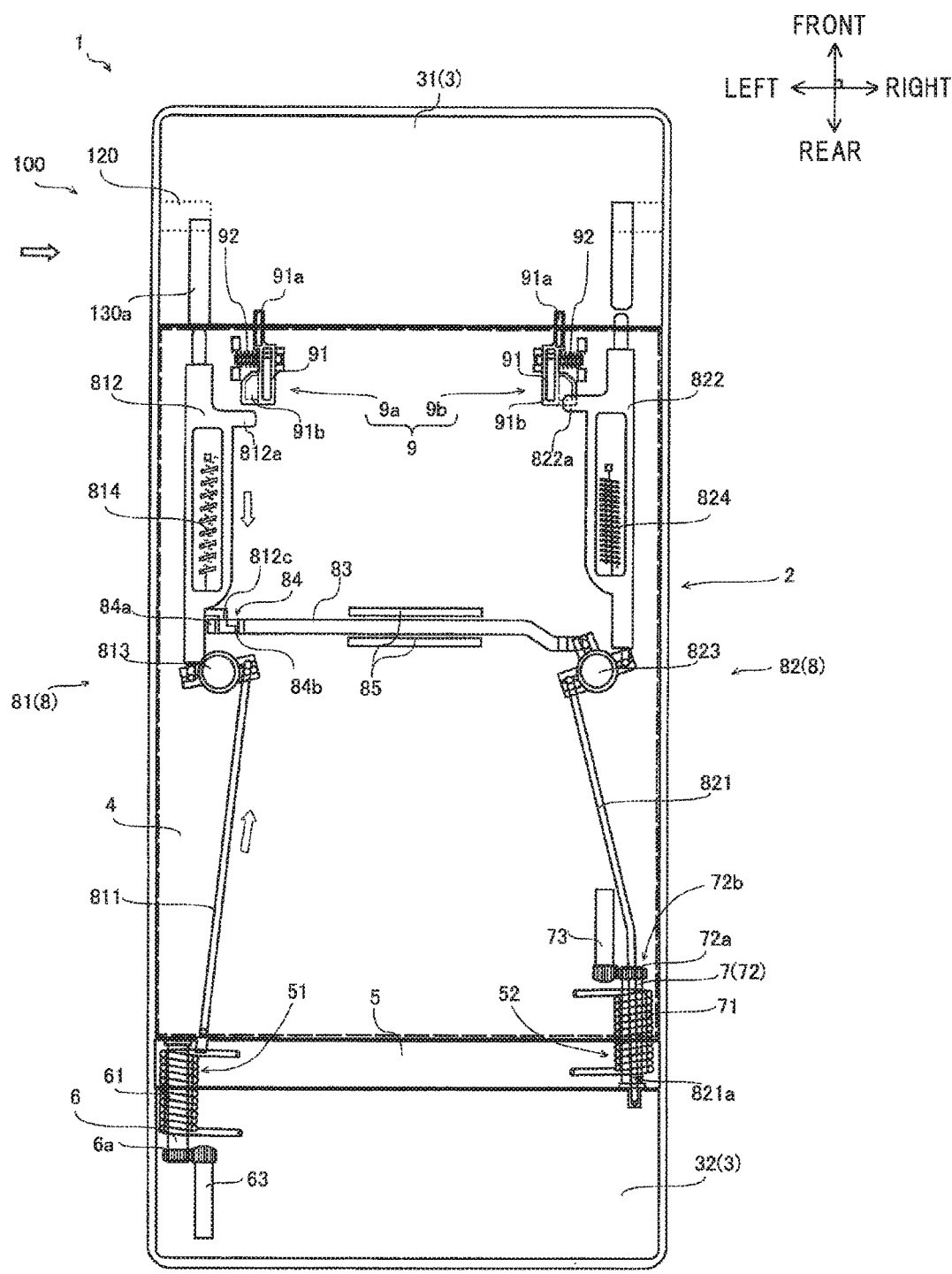
FIG. 3 is a diagram illustrating the lid mechanism according to the embodiment in order to describe the action of a locking element in a second opened state.
Figure 4:
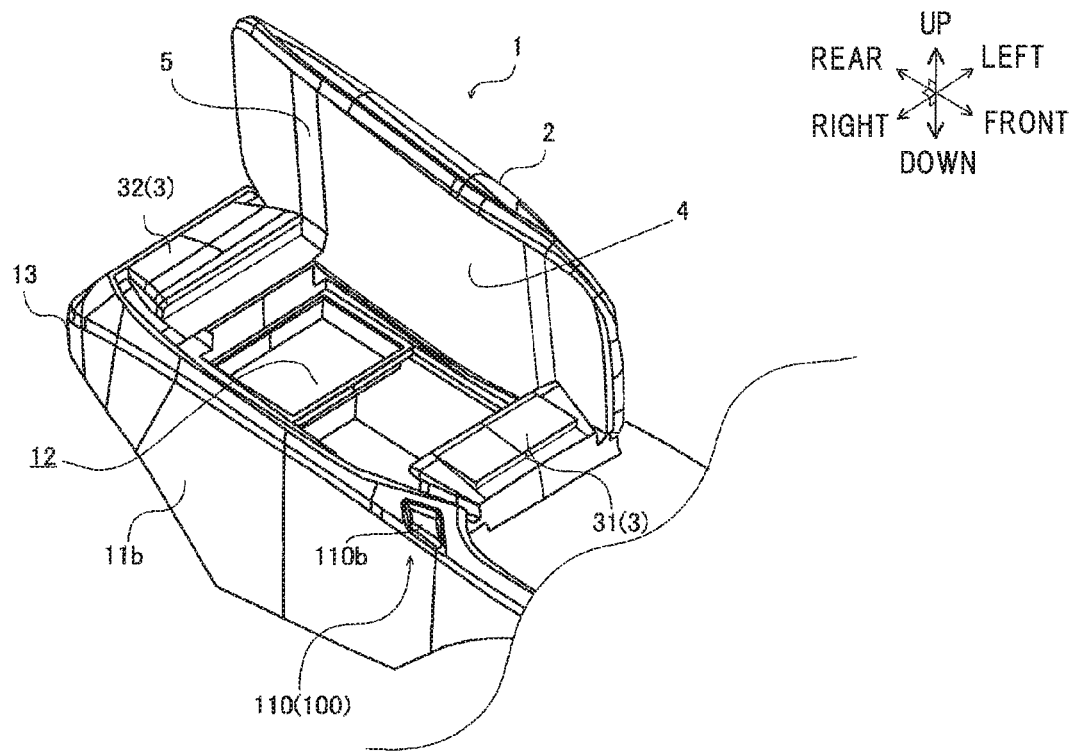
FIG. 4 is a diagram illustrating the lid mechanism according to the embodiment in order to describe one aspect of the first opened state.
Figure 5:
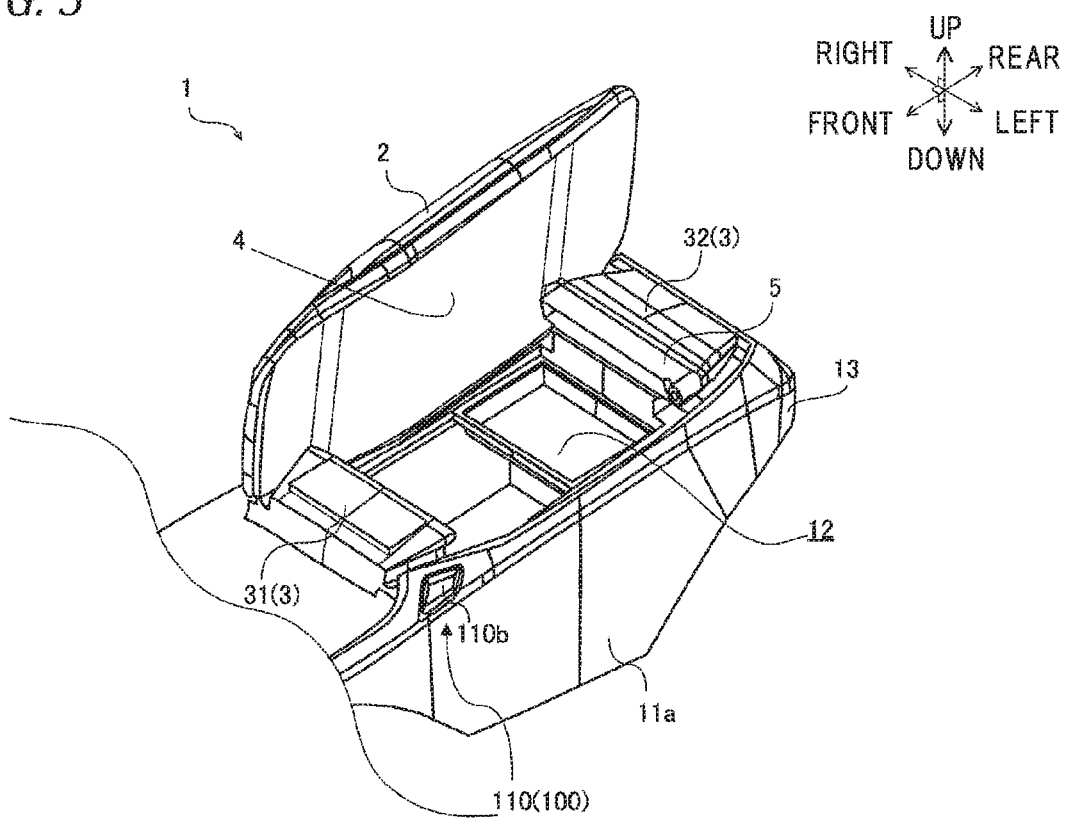
FIG. 5 is a diagram illustrating the lid mechanism according to the embodiment in order to describe one aspect of the second opened state.

FIGS. 1 to 8 illustrate the lid mechanism 1 according to the embodiment. The lid mechanism 1 according to the embodiment and a box main body 11 including a storage portion 12 constitute a console box disposed between a driver's seat and a front passenger seat. As illustrated in FIGS. 4 and 5, the box main body 11 is a box-shaped body including the storage portion 12 that can store goods and the like and is open toward the upside of the vehicle. An outer edge shape of the opening is substantially the same as that of the lid 2. The box main body 11 includes an unlock switch 100 that is provided on each of left and right side walls 11a and 11b. The unlock switch 100 changes the state of a locking element 8 from a locked state to an unlocked state such that the lid 2 is to be pivotable. The unlock switch 100 will be described below.

The lid mechanism 1 according to the embodiment is assembled to the upside of the box main body 11, and includes a base portion 3 and the lid 2. The base portion 3 includes a front base portion 31 that constitutes a front end portion of the lid mechanism 1 and a rear base portion 32 that constitutes a rear end portion of the lid mechanism 1. The lid 2 is interposed between the front base portion 31 and the rear base portion 32. The front base portion 31 and the rear base portion 32 are integrated into the box main body 11, and the lid 2 is supported so as to pivot in both left and right directions with respect to the front base portion 31 and the rear base portion 32. As illustrated in FIG. 1, in the lid mechanism 1 according to the embodiment, the lid 2, the front base portion 31, and the rear base portion 32 are disposed on the same plane in a closed state where the lid 2 is closed.

The state of the lid 2 changes between a closed state where the storage portion 12 is shielded from the interior of the vehicle, a first opened state where an arm portion 5 and a lid main body 4 pivot about a first support shaft 6 described below to expose the storage portion 12, and a second opened state where the lid main body 4 pivots about a second support shaft 7 described below to expose the storage portion 12. In the first opened state and the second opened state, at least a part of the storage portion 12 is exposed to the interior of the vehicle.

As illustrated in FIG. 1, the lid 2 includes the lid main body 4, the arm portion 5, the first support shaft 6, and the second support shaft 7. The arm portion 5 is provided on the rear end side of the lid main body 4 to be parallel to the lid main body 4. Specifically, the arm portion 5 is interposed between the lid main body 4 and the rear base portion 32 such that the lid 2 is openable alternatively from a left end side or a right end side. The arm portion 5 is pivotable with respect to the rear base portion 32 and is pivotable with respect to the lid main body 4. The first support shaft 6 supports the arm portion 5 such that the arm portion 5 is pivotable with respect to the rear base portion 32. The second support shaft 7 supports the lid main body 4 such that the lid main body 4 is pivotable with respect to the arm portion. In FIG. 1, the first support shaft 6 is disposed on the left end side of the lid 2, and the second support shaft 7 is disposed on the right end side of the lid 2.

The lid main body 4 according to the embodiment has a hollow structure in which an inner panel (not illustrated) and an outer panel (not illustrated) are integrated. The inner panel is positioned on the box main body 11 side, and the outer panel is positioned on the interior side of the vehicle. The lid main body 4 includes the locking element 8 and a flap element 9. The locking element 8 and the flap element 9 are interposed between the inner panel and the outer panel.

The locking element 8 locks the lid 2 to the box main body 11, or unlocks the lid 2 such that the lid 2 is pivotable with respect to the box main body 11. That is, the locking of the lid 2 represents restricting the state of the lid 2 from changing from the closed state to the first opened state or the second opened state. The unlocking of the lid 2 represents enabling the state of the lid 2 to change from the closed state to the first opened state or the second opened state.

As illustrated in FIG. 1, the locking element 8 includes: a first locking element 81 that is provided on the left end side of the lid main body 4; and a second locking element 82 that is provided on the right end side of the lid main body 4.

As illustrated in FIGS. 1 to 3, the first locking element 81 includes a first main rod 811, a first sub-rod 812, a first synchronization element 813, and a first rod biasing member 814.

The first main rod 811 is disposed on the rear side of the lid main body 4 to extend in the front-rear direction, and the first sub-rod 812 is disposed on the front side of the lid main body 4 to extend in the front-rear direction. The first main rod 811 and the first sub-rod 812 are supported by the lid main body 4 so as to reciprocate in the front-rear direction relative to each other.

The first sub-rod 812 includes: a flap contact portion 812a that is provided on the front end side and can come into contact with a first flap element 9a to be described later; and an engaging protrusion 812c that is provided on the rear end side and can be inserted to a transmission rod engaging hole 84b to be described later. The flap contact portion 812a has a pressure receiving inclined surface 812b on a surface facing the first flap element 9a, and the pressure receiving inclined surface 812b is inclined rearward from the upside to the downside.

The first synchronization element 813 synchronizes movements of the first main rod 811 and the first sub-rod 812 in a direction in which the first main rod 811 and the first sub-rod 812 move toward or away from each other. In the embodiment, the first synchronization element 813 is a disk-shaped rotating mechanism that is rotatably supported by the lid main body 4. In a radially outer portion of the first synchronization element 813, a front end portion of the first main rod 811 and a rear end portion of the first sub-rod 812 are supported at a distance from each other in a circumferential direction. Specifically, the front end portion of the first main rod 811 and the rear end portion of the first sub-rod 812 are disposed to be substantially symmetrical to each other with respect to the rotation center of the first synchronization element 813.

The first rod biasing member 814 biases the first main rod 811 and the first sub-rod 812 in a direction in which the first main rod 811 and the first sub-rod 812 move away from each other. In the embodiment, the first rod biasing member 814 is a spiral spring, one end of which is fixed to the first sub-rod 812, and the other end of which is fixed to the lid main body 4. That is, the first rod biasing member 814 typically biases the first synchronization element 813 such that the first synchronization element 813 rotates clockwise in FIG. 1.

As illustrated in FIGS. 1 and 2, when the lid 2 is in the closed state (refer to FIG. 1) and the unlock switch 100 is not operated, or when the lid 2 is in the first opened state (refer to FIG. 2), a front end of the first sub-rod 812 protrudes to the front side of the lid main body 4 and engages with the front base portion 31. In addition, a rear end of the first main rod 811 protrudes to the rear side of the lid main body 4 and engages with the arm portion 5. As illustrated in FIG. 3, in the lid mechanism 1 according to the embodiment, when the lid 2 is in the second opened state, the front end of the first sub-rod 812 and the rear end of the first main rod 811 enter into the lid main body 4.

Here, as illustrated in FIGS. 1 and 2, a state where the front end of the first sub-rod 812 and the rear end of the first main rod 811 protrude from the lid main body 4 will be referred to as a locked state of the first locking element 81 (hereinafter, referred to as "first locked state"). In addition, as illustrated in FIG. 3, a state where the front end of the first sub-rod 812 and the rear end of the first main rod 811 enter into the lid main body 4 (are stored in the lid main body 4) will be referred to as an unlocked state of the first locking element 81 (hereinafter, referred to as "first unlocked state").

As illustrated in FIGS. 1 to 3, the second locking element 82 includes a second main rod 821, a second sub-rod 822, a second synchronization element 823, and a second rod biasing member 824.

The second main rod 821 is disposed on the rear side of the lid main body 4 to extend in the front-rear direction, and the second sub-rod 822 is disposed on the front side of the lid main body 4 to extend in the front-rear direction. The second main rod 821 and the second sub-rod 822 are supported by the lid main body 4 so as to reciprocate in the front-rear direction relative to each other.

Figure 6:
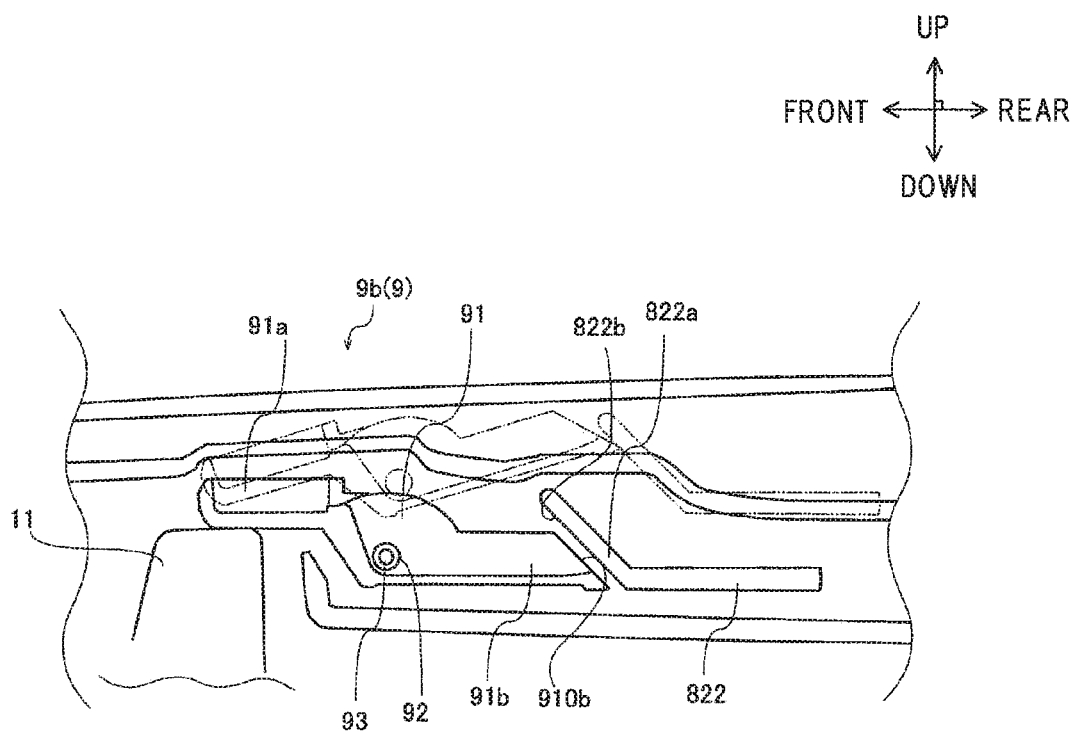
FIG. 6 is a cross-sectional view taken along line VI-VI of FIG. 1 schematically illustrating a flap element of the lid mechanism according to the embodiment.

The second sub-rod 822 includes a flap contact portion 822a that is provided on the front end side and can come into contact with a second flap element 9b to be described later. As illustrated in FIG. 6, the flap contact portion 822a of the second sub-rod 822 has a pressure receiving inclined surface 822b on a surface facing the second flap element 9b, and the pressure receiving inclined surface 822b is inclined rearward from the upside to the downside.

The second synchronization element 823 synchronizes movements of the second main rod 821 and the second sub-rod 822 in a direction in which the second main rod 821 and the second sub-rod 822 move toward or away from each other. In the embodiment, the second synchronization element 823 is a disk-shaped rotating mechanism that is rotatably supported by the lid main body 4. In a radially outer portion of the second synchronization element 823, a front end portion of the second main rod 821, a rear end portion of the second sub-rod 822, and a right end of a transmission rod 83 (to be described later) are supported at a distance from each other in a circumferential direction. Specifically, the front end portion of the second main rod 821 and the rear end portion of the second sub-rod 822 are disposed to be substantially symmetrical to each other with respect to the rotation center of the second synchronization element 823. The right end of the transmission rod 83 is disposed between the front end portion of the second main rod 821 and the rear end portion of the second sub-rod 822.

The second rod biasing member 824 biases the second main rod 821 and the second sub-rod 822 in a direction in which the second main rod 821 and the second sub-rod 822 move away from each other. In the embodiment, the second rod biasing member 824 is a spiral spring, one end of which is fixed to the second sub-rod 822, and the other end of which is fixed to the lid main body 4. That is, the second rod biasing member 824 typically biases the second synchronization element 823 such that the second synchronization element 823 rotates counterclockwise in FIG. 1.

As illustrated in FIGS. 1 and 3, when the lid 2 is in the closed state (refer to FIG. 1) and the unlock switch 100 is not operated, or when the lid 2 is in the second opened state (refer to FIG. 3), a front end of the second sub-rod 822 protrudes to the front side of the lid main body 4 and engages with the front base portion 31. In addition, a rear end of the second main rod 821 protrudes to the rear side of the lid main body 4 and engages with the rear base portion 32 through the arm portion 5. As illustrated in FIG. 2, in the lid mechanism 1 according to the embodiment, when the lid 2 is in the first opened state, the front end of the second sub-rod 822 enters into the lid main body 4, and the rear end of the second main rod 821 enters into the arm portion 5.

Here, as illustrated in FIGS. 1 and 3, a state where the front end of the second sub-rod 822 protrudes from the lid main body 4 and the rear end of the second main rod 821 protrudes from the arm portion 5 will be referred to as a locked state of the second locking element 82 (hereinafter, referred to as "second locked state"). In addition, as illustrated in FIG. 2, a state where the front end of the second sub-rod 822 enters into the lid main body 4 (is stored in the lid main body 4) and the rear end of the second main rod 821 enters into the arm portion 5 (is stored in the arm portion 5) will be referred to as an unlocked state of the second locking element 82 (hereinafter, referred to as "second unlocked state").

The lid mechanism 1 according to the embodiment includes the flap element 9. The flap element 9 includes: the first flap element 9a that is disposed on the front left end side of the lid main body 4 and can engage with the first locking element 81; and the second flap element 9b that is disposed on the front right end side of the lid main body 4 and can engage with the second locking element 82.

In the second opened state, that is, when the second locking element 82 is in the second locked state and the first locking element 81 is in the first unlocked state, the first flap element 9a maintains the first unlocked state of the first locking element 81. In the first opened state, that is, when the first locking element 81 is in the first locked state and the second locking element 82 is in the second unlocked state, the second flap element 9b maintains the second unlocked state of the second locking element 82.

As illustrated in FIG. 1, the flap element 9 according to the embodiment includes: the first flap element 9a that is provided on the first locking element 81 side; and the second flap element 9b that is provided on the second locking element 82 side. The first flap element 9a and the second flap element 9b have the same structure. Therefore, hereinafter, the flap element 9 will be described using the second flap element 9b as an example.

As illustrated in FIG. 6, the second flap element 9b includes a flap main body 91, a flap biasing member 92, and a flat rotating shaft 93. The flap main body 91 is a long plate body that is provided along the front-rear direction, and includes: a box contact portion 91a that is provided on the front end portion and can come into contact with the box main body 11; and a rod contact portion 91b that is provided on the rear end portion and can come into contact with the flap contact portion 822a of the second sub-rod 822.

The flap main body 91 is disposed such that the rod contact portion 91b can come into contact with the flap contact portion 822a provided in the second sub-rod 822 of the second locking element 82 and such that the box contact portion 91a protrudes to the front side of the lid main body 4 and can come into contact with the box main body 11.

As illustrated in FIG. 6, a tip portion of the rod contact portion 91b has a tapered shape, and the rod contact portion 91b has a pressing inclined surface 910b that faces the pressure receiving inclined surface 822b of the flap contact portion 822a provided in the second sub-rod 822. The pressing inclined surface 910b is inclined rearward from the upside to the downside.

The flat rotating shaft 93 is the rotation center (pivot center) of the flap main body 91 and is integrated with the flap main body 91. In the center portion of the flap main body 91, the flat rotating shaft 93 protrudes from both left and right ends of the flap main body 91 in the left-right direction. The flat rotating shaft 93 is supported by the lid main body 4 such that the flap main body 91 can pivot about the flat rotating shaft 93 in a seesaw manner.

The flap biasing member 92 biases the flap main body 91 such that the rod contact portion 91*b* can come into contact with the flap contact portion 822*a* of the second sub-rod 822. In the embodiment, the flap biasing member 92 biases the flap main body 91 such that the rod contact portion 91*b* of the flap main body 91 is positioned above the box contact portion 91*a*. One end of the flap biasing member 92 is fixed to the flap main body 91, and the other end of the flap biasing member 92 is fixed to the lid main body 4. The biasing force of the flap biasing member 92 is higher than that of the second rod biasing member 824.

In a state where the box contact portion 91*a* of the flap main body 91 is not in contact with the box main body 11, the rod contact portion 91*b* presses the flap contact portion 822*a*. At this time, the pressing inclined surface 910*b* of the rod contact portion 91*b* and the pressure receiving inclined surface 822*b* of the flap contact portion 822*a* are inclined surfaces facing each other. As a result, the pressing of the rod contact portion 91*b* can be effectively converted into pressing in the moving direction of the second sub-rod 822. Therefore, interrelation between the rod contact portion 91*b* and the flap contact portion 822*a* is improved.

The rod contact portion 91*b* presses the flap contact portion 822*a*, and the biasing force of the flap biasing member 92 is higher than that of the second rod biasing member 824. As a result, the second sub-rod 822 moves in the rear direction. A tip of each of the second sub-rod 822 and the second main rod 821 is stored in the lid 2. That is, in the lid mechanism 1 according to the embodiment, when the box contact portion 91*a* of the flap main body 91 is not in contact with the box main body 11, the tip of each of the second sub-rod 822 and the second main rod 821 does not protrude from the lid 2.

On the other hand, in a state where the box contact portion 91*a* of the flap main body 91 is in contact with the box main body 11, the pressing of the second flap element 9*b* to the second sub-rod 822 is released, and the second sub-rod 822 moves in the front direction according to the biasing force of the second rod biasing member 824 that is higher than that of the flap biasing member 92. That is, in the closed state of the lid 2, the tip of each of the second sub-rod 822 and the second main rod 821 protrudes from the lid 2, and each of the second sub-rod 822 and the second main rod 821 engages with the box main body.

In the embodiment, when the state of the lid 2 changes from the opened state to the closed state, the box contact portion 91*a* comes into contact with the box main body 11, and the box contact portion 91*a* is pressed up by the box main body 11 against the biasing force of the flap biasing member 92. Accordingly, the rod contact portion 91*b* is pressed down. In a period from the contact between the box contact portion 91*a* and the box main body 11 to the closed state of the lid, the rod contact portion 91*b* gradually moves downward. When the lid 2 enters into the closed state, the downward movement of the rod contact portion 91*b* ends, and the flap main body 91 is parallel to the lid main body 4.

The box contact portion 91*a* comes into contact with the box main body 11 such that the pressing of the rod contact portion 91*b* to the flap contact portion 822*a* is released. When this pressing is released, the second sub-rod 822 moves in the front direction according to the biasing force of the second rod biasing member 824. Here, the inclined surfaces (the pressing inclined surface 910*b* and the pressure receiving inclined surface 822*b*) of the rod contact portion 91*b* and the flap contact portion 822*a* which face each other come into contact with each other. As a result, the rod contact portion 91*b* gradually moves downward, and the second sub-rod 822 gradually moves in the front direction. When the lid 2 enters into the closed state, the tip of each of the second sub-rod 822 and the second main rod 821 protrudes from the lid 2 and engages with the box main body 11.

When the box contact portion 91*a* is pressed up by a misoperation of the operator while the box contact portion 91*a* of the flap main body 91 is not in contact with the box main body 11, the pressing of the rod contact portion 91*b* to the flap contact portion 822*a* is released, and the tips of the second sub-rod 822 and the second main rod 821 may protrude from the lid 2. However, the second flap element 9*b* according to the embodiment has the inclined surfaces which are the contact surfaces (the pressing inclined surface 910*b* and the pressure receiving inclined surface 822*b*) of the rod contact portion 91*b* and the flap contact portion 822*a*. As a result, the pressing of the rod contact portion 91*b* is effectively converted into pressing in the moving direction of the second sub-rod 822, and interrelation between the rod contact portion 91*b* and the flap contact portion 822*a* is improved. Further, the biasing force of the flap biasing member 92 is higher than that of the second rod biasing member 824. With the above-described configuration, for example, even when a misoperation of the operator occurs, the second flap element 9*b* can press and move the second sub-rod again after the misoperation is canceled, and the tips of the second sub-rod 822 and the second main rod 821 protruding from the lid 2 can be stored in the lid 2.

The locking element 8 in the lid mechanism 1 according to the embodiment further includes the transmission rod 83. In a case where one of the first locking element 81 and the second locking element 82 is in the unlocked state, the transmission rod 83 restricts the state of the other one of the first locking element 81 and the second locking element 82 from changing from the locked state to the unlocked state.

As illustrated in FIGS. 1 to 3, the transmission rod 83 according to the embodiment extends in the left-right direction. The transmission rod 83 extends from the first locking element 81 side to the second locking element 82 side, and is supported by a guide 85, which is provided in the lid main body 4, so as to be movable in the left-right direction. A right end of the transmission rod 83 is supported by the second synchronization element 823. The transmission rod 83 and the second rod biasing member 824 supported by the second synchronization element 823 are disposed to be substantially symmetrical to each other with respect to the rotation center of the second synchronization element 823. Therefore, when the second sub-rod 822 and the second main rod 821 moves in a direction toward each other, the transmission rod 83 moves in the right direction, and when the second sub-rod 822 and the second main rod 821 moves in a direction away from each other, the transmission rod 83 moves in the left direction. In other words, when the second synchronization element 823 rotates clockwise, the transmission rod 83 moves away from the first locking element 81 in the right direction, and when the second synchronization element 823 rotates counterclockwise, the transmission rod 83 moves toward the first locking element 81 in the left direction.

A transmission rod tip portion 84, which is a tip of the transmission rod 83 on the left end side, is a free end. In the transmission rod tip portion 84, a transmission rod engaging hole 84*b* is provided in the form of a through hole. A portion of a circumferential portion of the transmission rod engaging hole 84b which is positioned on the leftmost end of the transmission rod tip portion 84 will be referred to as a transmission rod contact portion 84a. The transmission rod engaging hole 84b can engage with the engaging protrusion 812c provided in the first sub-rod 812. Specifically, in the second locked state, the engaging protrusion 812c can be inserted into the transmission rod engaging hole 84b. In the second unlocked state, the transmission rod contact portion 84a can come into contact with a tip of the engaging protrusion 812c.

As illustrated in FIG. 1, in the closed state of the lid 2, the first locking element 81 is in the first locked state, and the second locking element 82 is in the second locked state. In the closed state of the lid 2, the transmission rod engaging hole 84b and the engaging protrusion 812c face each other in the front-rear direction but do not engage with each other. At this time, the transmission rod engaging hole 84b is positioned on the rear side of the engaging protrusion 812c. At this time, the transmission rod contact portion 84a and the engaging protrusion 812c also do not engage with each other.

The arm portion 5 according to the embodiment is a plate-shaped body whose longitudinal direction is the left-right direction, and the width of the arm portion 5 is substantially the same as the width of the lid main body 4 in the left-right direction. The arm portion 5 includes a first arm through hole 51 on the left end side and a second arm through hole 52 on the right end side.

The first support shaft 6 is inserted into the first arm through hole 51. Specifically, a front end portion of the first support shaft 6 is inserted into the first arm through hole 51 and fixed to the arm portion. A rear end portion of the first support shaft 6 protrudes from the first arm through hole 51 and is rotatably supported by the rear base portion 32. Therefore, the arm portion 5 can pivot with respect to the rear base portion 32 due to the first support shaft 6, and the first support shaft 6 pivots together with the arm portion 5. A first arm spring 61 that biases the arm portion 5 toward a first fully opened position illustrated in FIG. 4 is wound around the first support shaft 6.

In the embodiment, the first arm spring 61 is a torsion spring. One end of the first arm spring 61 is inserted into the first arm through hole 51 and fixed, and the other end of the first arm spring 61 is fixed to the rear base portion 32.

A collar 72 is inserted into the second arm through hole 52. The collar 72 is a cylindrical body having a through hole 72b. A front end portion of the collar 72 is rotatably supported in the lid main body 4, and a rear end portion of the collar 72 is fixed to the second arm through hole 52. In other words, the collar 72 rotatably (pivotably) supports the lid main body 4.

A second arm spring 71 that biases the lid main body 4 toward a second fully opened position illustrated in FIG. 5 is wound around an outer circumference of the collar 72. A second rod rear end portion 821a, which is a rear end portion of the second main rod 821, is inserted into the through hole 72b of the collar 72. The second rod rear end portion 821a can pass through the arm portion 5 and engage with the rear base portion 32.

In the embodiment, the second support shaft 7 is the collar 72, and the second rod rear end portion 821a that can engage with the rear base portion 32 is inserted into the through hole 72b of the collar 72. That is, the collar 72 and the second rod rear end portion 821a are disposed coaxially.

The second arm spring 71 is a torsion spring, one end of which is fixed to the inside of the lid main body 4, and the other end of which is inserted into the second arm through hole 52 and is fixed to the arm portion 5.

The lid mechanism 1 according to the embodiment includes a first damper 63 and a second damper 73 that reduce a pivoting speed of the lid 2. The first damper 63 reduces the pivoting speed of the lid 2 that pivots according to the biasing force of the first arm spring 61 in the first opened state of the lid 2. The second damper 73 reduces the pivoting speed of the lid 2 that pivots according to the biasing force of the second arm spring 71 in the second opened state of the lid 2. Specifically, the first damper 63 reduces the rotating speed of the first support shaft 6, and the second damper 73 reduces the rotating speed of the second support shaft 7. The first damper 63 and the second damper 73 are not particularly limited. In the lid mechanism 1 according to the embodiment, an oil damper is used.

Figure 7:
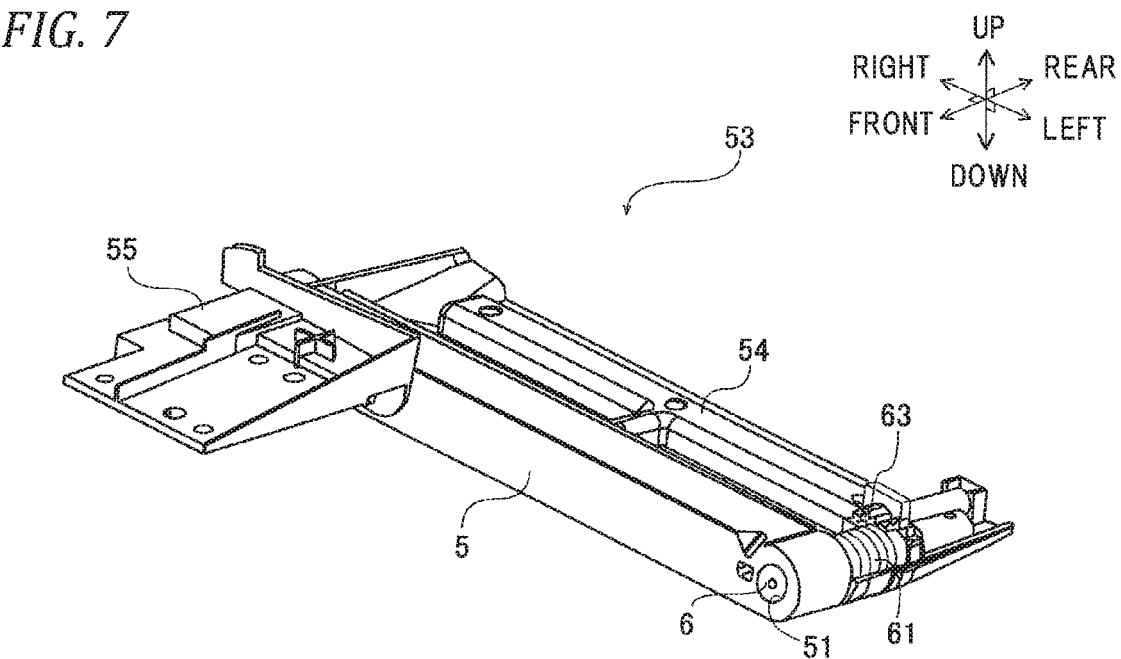
FIG. 7 is a perspective view illustrating an arm unit in the lid mechanism according to the embodiment.

In the lid mechanism 1 according to the embodiment, the first arm spring 61, the second arm spring 71, the first support shaft 6 around which the first arm spring 61 is wound, the collar 72 around which the second arm spring 71 is wound, the first damper 63, and the second damper 73 are attached to a first assembly member 54 and a second assembly member 55, and the first assembly member 54 and the second assembly member 55 are connected to each other through the arm portion 5 to form an arm unit 53 (refer to FIG. 7).

Figure 8:
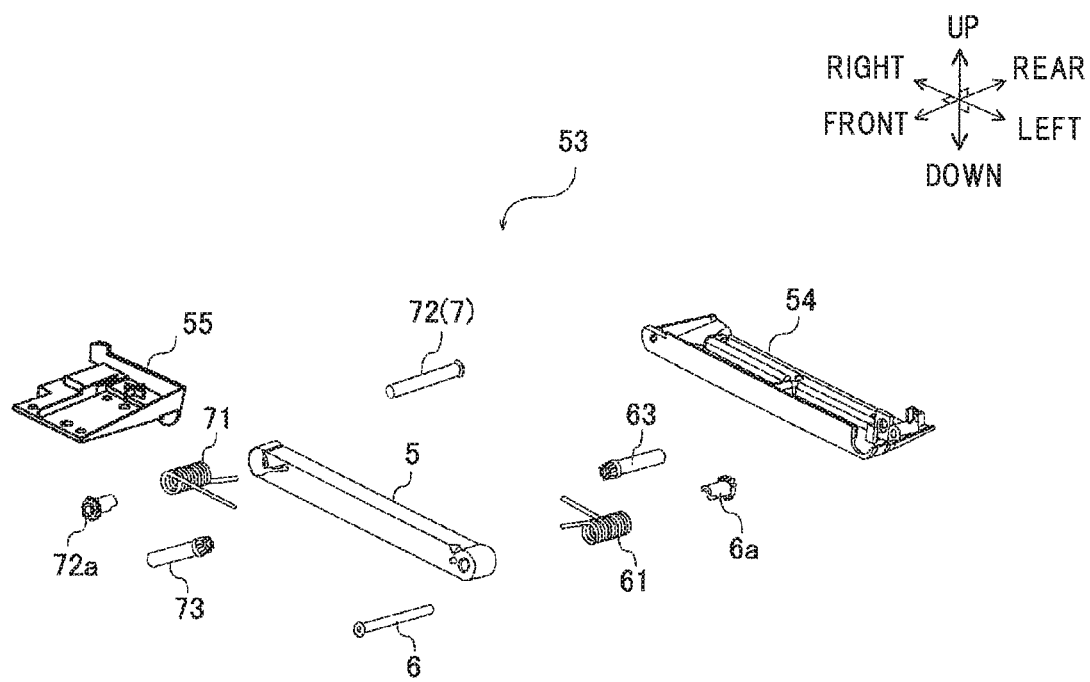
FIG. 8 is an exploded perspective view illustrating the arm unit in the lid mechanism according to the embodiment.

Specifically, as illustrated in FIGS. 7 and 8, the first assembly member 54 is provided on the rear left end side of the arm portion 5. The first assembly member 54 rotatably supports the first support shaft 6 that is inserted into the first arm through hole 51 and protrudes from the first arm through hole 51 to the rear side. The first assembly member 54 is fixed to an end portion of the first arm spring 61 that protrudes from the first arm through hole 51 to the rear side. Further, the first assembly member 54 holds the first damper 63 such that the first damper 63 meshes with shaft teeth 6a provided in the first support shaft 6.

The second assembly member 55 is provided on the front right end side of the arm portion 5. The second assembly member 55 supports the collar 72 that is inserted into the second arm through hole 52 and protrudes from the second arm through hole 52 to the front side. The second assembly member 55 is fixed to an end portion of the second arm spring 71 that protrudes from the second arm through hole 52 to the front side. Further, the second assembly member 55 holds the second damper 73 such that the second damper 73 meshes with collar teeth 72a provided in the collar 72.

The arm unit 53 which is unitized is disposed such that the arm portion 5 in the lid mechanism 1 according to the embodiment is interposed between the rear base portion 32 and the lid main body 4. In the arm unit 53, the first assembly member 54 is attached to the rear base portion 32, and the second assembly member 55 is attached to the lid main body 4.

The arm portion 5 is unitized into the arm unit 53, and the arm unit 53 is attached to the lid mechanism 1. As a result, the assembly of the lid mechanism 1 according to the embodiment becomes easy, and thus the productivity is improved.

The unlock switch 100 is provided in each of the left and right side walls 11a and 11b of the box main body 11. As illustrated in FIGS. 4 and 5, the unlock switch 100 includes: a button portion 110 that is provided on each of the side walls of the box main body 11; and a switch mechanism portion 120 (refer to FIGS. 1 to 3) that is disposed in the box main body 11 capable of engaging with the button portion 110 and the locking element 8. The pair of unlock switches 100 that are provided on the left and right side walls of the box main body 11 have the same structure. Therefore, the unlock switch 100, which is provided on the left side wall 11a of the box main body 11 and can engage with the first locking element 81, will be described.

The button portion 110 includes: a button base 110a that is attached to a through window provided on the side wall of the box main body 11; and a button 110b that is held so as to be movable relative to the button base 110a in the left-right direction. The button 110b is biased toward the left side (outside) so as to be disposed on the same plane with the left side wall 11a of the box main body 11 by a spring (not illustrated). That is, the button 110b is configured such that the biasing force accumulates on the spring by the operator pressing the button 110b and, after releasing the pressing of the operator, the button 100b returns to the original position due to the biasing force of the spring, that is, is disposed on the same plane with the left side wall 11a of the box main body 11.

A cylindrical portion (not illustrated) that protrudes toward the inside of the box main body 11 is formed on a back surface of the button 110b facing the inside of the box main body 11. The cylindrical portion has a pair of inclined walls that protrude from an outer circumferential surface of the cylindrical portion and extend along the outer circumferential surface of the cylindrical portion in the same direction as the protruding direction of the cylindrical portion. Each of the pair of inclined walls has a semicircular arc shape in cross-section in which the height of a region from a base portion to a tip portion gradually changes in a circumferential direction. That is, the tip surface of each of the inclined walls has an inclined surface. The pair of inclined walls can engage with a pair of engaging portions, respectively, that are provided in a rotating body portion of the switch mechanism portion 120 described below.

The switch mechanism portion 120 includes a switch base portion (not illustrated), the rotating body portion (not illustrated), and a rotating body biasing portion (not illustrated). The switch base portion is attached to the box main body 11 in the box main body 11. In the switch base portion, the rotating body portion and the rotating body biasing portion are held.

The rotating body portion is supported so as to be rotatable with respect to the switch base portion and includes the pair of engaging portions that can engage with the pair of inclined walls of the button 110b. The pair of inclined walls formed in the cylindrical portion of the button 110b and the pair of engaging portions formed in the rotating body portion are disposed such that the inclined walls presses the engaging portions so as to rotate the rotating body portion when the inclined walls engage with the engaging portions. When the inclined walls engage with the engaging portions and press the engaging portions, the rotating body portion rotates in a direction opposite to the biasing direction of the rotating body biasing portion.

The rotating body portion includes a rotating body arm portion 130a that protrudes from an outer circumference of the rotating body portion such that a tip portion thereof can come into contact with a tip portion of the first sub-rod 812 of the first locking element 81. The rotating body arm portion 130a extends from the rotating body portion to the upside to be curved and is provided such that the tip portion thereof can come into contact with the tip portion of the first sub-rod 812 protruding from the lid main body 4. The tip portion of the rotating body arm portion 130a is formed to be movable in the same direction as the moving direction of the first sub-rod 812.

When the rotating body portion rotates against the biasing force of the rotating body biasing portion, the rotating body arm portion 130a comes into contact with and presses the tip portion of the first sub-rod 812. On the other hand, when the rotating body portion rotates according to the biasing force of the rotating body biasing portion, the rotating body arm portion 130a is separated from the tip portion of the first sub-rod 812.

The rotating body biasing portion biases the rotating body portion such that the rotating body portion rotates counterclockwise when seen from the left side wall 11a of the box main body 11 by the operator.

The unlock switch 100 operates as follows. When the operator presses the button 110b, which is provided on the left side wall 11a, to the right side, the cylindrical portion formed on the back surface of the button 110b moves toward the rotating body portion of the switch mechanism portion 120. As a result, the pair of inclined walls formed in the cylindrical portion engage with the pair of engaging portions provided in the rotating body portion, respectively. At this time, the pair of inclined walls of the cylindrical portion press the pair of engaging portions of the rotating body portion, respectively, such that the rotating body portion rotates clockwise. That is, the inclined walls press the engaging portions, respectively, against the biasing force of the rotating body biasing portion.

When the rotating body portion rotates clockwise, the rotating body arm portion 130a moves toward the tip portion of the first sub-rod 812 together with the rotation of the rotating body portion. The rotating body arm portion 130a comes into contact with the tip portion of the first sub-rod 812, and then presses the tip portion of the first sub-rod 812 until the tip portion is stored in the lid main body 4.

When the pressing of the operator to the button 110b is released, the button 110b returns to the original position according to the biasing force of the spring. As a result, the engagement between the inclined walls and the engaging portions is released such that the rotating body portion rotates counterclockwise according to the biasing force of the rotating body biasing portion. Thus, the rotating body arm portion 130a, which moves together with the rotation of the rotating body portion, moves in a direction away from the first sub-rod 812.

Hereinafter, the operation of the lid mechanism 1 according to the embodiment will be described. In the lid mechanism 1 according to the embodiment, the lid 2 is configured to be openable in both directions of the right end side and the left end side. When the lid 2 is opened and closed from the right end side, the lid 2 including the lid main body 4 and the arm portion 5 pivots such that the state of the lid 2 changes between the closed state and the first opened state. At this time, the front end of the first sub-rod 812 of the first locking element 81 and the first support shaft 6 function as a pivot shaft of the lid 2. When the lid 2 is opened and closed from the left end side, only the lid main body 4 pivots without the arm portion 5 pivoting such that the state of the lid 2 changes between the closed state and the second opened state. At this time, the front end of the second sub-rod 822 of the second locking element 82 and the second support shaft 7 function as a pivot shaft of the lid 2.

The change of the state of the lid 2 from the closed state to the first opened state will be described with reference to FIGS. 2 and 4. First, the state of the second locking element 82 is changed from the second locked state to the second unlocked state. That is, the operator operates the unlock switch 100 provided on the right side wall 11b of the box main body 11. Specifically, the operator presses the button 110b to the left side and moves the button 110b in the left direction.

When the operator presses the button 110b to the left side, the rotating body portion rotates as described above, and the rotating body arm portion moves toward the second sub-rod 822 together with the rotation of the rotating body portion and presses a tip portion of the second sub-rod 822 protruding from the lid main body 4. This way, by the operator operating the unlock switch 10X), the second sub-rod 822 moves to the rear side, and the tip portion of the second sub-rod 822 is stored in the lid main body 4.

When the second sub-rod 822 moves to the rear side, the second synchronization element 823 that supports the second sub-rod 822 rotates clockwise. At this time, the second main rod 821 that is supported by the second synchronization element 823 moves to the front side because the second main rod 821 is pulled forward by the second synchronization element 823. That is, by the operator pressing the button 110b, the second sub-rod 822 and the second main rod 821 move in a direction toward each other due to the clockwise rotation of the second synchronization element 823. As a result, the front end of the second sub-rod 822 is separated from the front base portion 31, and the rear end of the second main rod 821 is separated from the rear base portion 32.

When the front end of the second sub-rod 822 is separated from the front base portion 31 and the rear end of the second main rod 821 is separated from the rear base portion 32, locking by the second locking element 82 between the lid 2, which includes the lid main body 4 and the arm portion 5, and the box main body 11 is released. That is, the second locking element 82 enters into the second unlocked state, and the lid 2 can pivot according to the biasing force of the first arm spring 61. In other words, the state of the second locking element 82 can change from the second locked state to the second unlocked state. In the second locked state, the second sub-rod 822 receives the biasing force to the front side from the second rod biasing member 824, through the second synchronization element 823. Therefore, in order to move the second sub-rod 822 to the rear side, it is necessary that the operator press the button 110b with a force against the biasing force of the second rod biasing member 824.

When the second locking element 82 is in the second unlocked state, the lid main body 4 and the arm portion 5 pivot together in a direction in which the lid is opened according to the biasing force of the first arm spring 61. At this time, the front end of the first sub-rod 812 provided on the left end side and the first support shaft 6 function as a pivot shaft of the lid 2. This way, the state of the lid 2 changes from the closed state to the first opened state according to the biasing force of the first arm spring 61.

The lid mechanism 1 according to the embodiment includes the second flap element 9b that maintains the second unlocked state of the second locking element 82 in the first opened state of the lid 2. Hereinafter, the action of the second flap element 9b will be described. In the closed state and the first opened state of the lid, the box contact portion 91a of the flap main body 91 in the first flap element 9a is typically in contact with the box main body 11. Accordingly, the rod contact portion 91b of the first flap element 9a does not press and move the flap contact portion 812a of the first sub-rod 812, and the state of the first locking element 81 does not change from the first locked state to the first unlocked state.

In the closed state of the lid 2, the box contact portion 91a of the flap main body 91 is in contact with the front base portion 31. At this time, the pressing inclined surface 910b of the rod contact portion 91b does not press the pressure receiving inclined surface 822b of the flap contact portion 822a in the second sub-rod 822. Accordingly, the second sub-rod 822 and the second main rod 821 move in a direction away from each other according to the biasing force of the second rod biasing member 824, that is, the second locking element 82 enters into the second locked state.

When the state of the lid 2 changes from the closed state to the first opened state, the position of the second flap element 9b changes together with the lid main body 4, and the second flap element 9b is separated from the front base portion 31. Therefore, the flap main body 91 of the second flap element 9b pivots such that the box contact portion 91a moves down and the rod contact portion 91b moves up according to the biasing force of the flap biasing member 92. As a result, the biasing force of the flap biasing member 92 that biases the flap main body 91 is higher than the biasing force of the second rod biasing member 824 that biases the second sub-rod 822. As a result, the rod contact portion 91b presses and moves the flap contact portion 822a. Accordingly, the second sub-rod 822 moves to the rear side, and thus the second main rod 821 moves to the front side. In addition, the pressing inclined surface 910b of the rod contact portion 91b and the pressure receiving inclined surface 822b of the flap contact portion 822a are inclined surfaces facing each other. Therefore, the pressing of the second flap element 9b is effectively converted into pressing in the moving direction (front-rear direction) of the second sub-rod 822 and the second main rod 821. That is, interrelation between the second flap element 9b, the second sub-rod 822, and the second main rod 821 is improved.

As described above, when the state of the lid 2 changes from the closed state to the first opened state, the operator presses the button 110b of the unlock switch 100. When the lid 2 enters into the opened state, the operator releases the hand from the button 110b. When the operator releases the hand, the button 110b returns to the original position due to the biasing force of the spring. By the operator pressing the button 110b, the second sub-rod 822 and the second main rod 821 move in a direction toward each other. When the operator releases the hand from the button 110b, the pressing of the rotating body arm portion 130a of the switch mechanism portion 120 to the second sub-rod 822 is released. Therefore, the second sub-rod 822 and the second main rod 821 are about to move in a direction away from each other according to the biasing force of the second rod biasing member 824. In other words, the second sub-rod 822 is about to move to the front side, and the second main rod 821 is about to move to the rear side.

At this time, however, the biasing force of the flap biasing member 92 is higher than the biasing force of the second rod biasing member 824 as described above. As a result, the rod contact portion 91b of the second flap element 9b presses the flap contact portion 822a of the second sub-rod 822, and moves up according to the biasing force of the flap biasing member 92. Thus, the movement of the second sub-rod 822 to the front side is restricted, and the movement of the second main rod 821 to the rear side is restricted. Accordingly, the movement of the second sub-rod 822 to the front side and the movement of the second main rod 821 to the rear side according to the biasing force of the second rod biasing member 824 are restricted, that is, the second unlocked state of the second locking element 82 is maintained. That is, in the first opened state of the lid 2, the second flap element 9b according to the embodiment can restrict the tip of each of the second sub-rod 822 and the second main rod 821 from protruding from the lid.

Here, it is assumed that, when the second flap element 9b maintains the second unlocked state of the second locking element 82, the operator presses (presses up) the box contact portion 91a of the flap main body 91 by mistake. In this case, the second unlocked state which is maintained by the second flap element 9b is released. That is, the rod contact portion 91b of the flap main body 91 is inclined downward, and the pressing of the rod contact portion 91b to the flap contact portion 822a of the second sub-rod 822 is released. Accordingly, the second sub-rod 822 and the second main rod 821 move in a direction away from each other according to the biasing force of the second rod biasing member 824, and the tip of each of the second sub-rod 822 and the second main rod 821 protrudes from the lid 2.

On the other hand, in the flap element 9 according to the embodiment, when the misoperation of the operator is canceled, that is, when the pressing to the box contact portion 91a is released, the second flap element 9b can maintain the second unlocked state of the second locking element 82 again. The reasons for this are as follows: the biasing force of the flap biasing member 92 that biases the flap main body 91 is higher than the biasing force of the second rod biasing member 824 that biases the second sub-rod 822; and the pressing inclined surface 910b of the rod contact portion 91b in the flap main body 91 and the pressure receiving inclined surface 822b of the flap contact portion 822a in the second sub-rod 822 are inclined surfaces facing each other.

When the misoperation to the box contact portion 91a is canceled, the rod contact portion 91b moves up while pressing the flap contact portion 822a due to the flap biasing member 92 having a biasing force higher than the biasing force of the second rod biasing member 824. Here, a direction in which the flap main body 91 applies a pressing force to the second sub-rod 822 is the up direction, but the pressing inclined surface 910b and the pressure receiving inclined surface 822b are inclined surfaces facing each other. Therefore, the pressing of the flap main body 91 in the up direction is effectively converted into pressing in the moving direction (front-rear direction) of the second sub-rod 822 and the second main rod 821. Accordingly, after the misoperation of the operator is canceled, the second flap element 9b can maintain the second unlocked state of the second locking element 82 again. That is, even when the misoperation occurs, in the first opened state of the lid 2, the tip of each of the second sub-rod 822 and the second main rod 821 can be effectively stored in the lid 2. In the second opened state of the lid 2, the first flap element 9a exhibits the same action as that of the above-described second flap element 9b.

In the lid mechanism 1 according to the embodiment, the transmission rod 83 is provided. When the operator presses the button 110b of the unlock switch 100 provided on the left side wall 11b of the box main body 11, the second sub-rod 822 and the second main rod 821 move in a direction toward each other. At this time, the second synchronization element 823 rotates clockwise, and the transmission rod 83 supported by the second synchronization element 823 is pulled by the second synchronization element 823 and moves to the right side. When the transmission rod 83 moves to the right side, the transmission rod contact portion 84a present at the transmission rod tip portion 84 faces the engaging protrusion 812c provided in the first sub-rod 812. At this time, the transmission rod contact portion 84a is positioned upstream of the engaging protrusion 812c on the movement locus of the engaging protrusion 812c.

Since the transmission rod contact portion 84a is positioned upstream of the engaging protrusion 812c on the movement locus of the engaging protrusion 812c, the movement of the first sub-rod 812 in the rear direction is restricted. The reason for this is as follows. When the first sub-rod 812 is about to move to the rear side, the transmission rod contact portion 84a, which is positioned an upstream side on the movement locus of the engaging protrusion 812c of the first sub-rod 812, comes into contact with the engaging protrusion 812c. When the movement of the first sub-rod 812 to the rear side is restricted, the movement of the first main rod 811 that is synchronized with the first sub-rod 812 by the first synchronization element 813 is also restricted.

Accordingly, in the first opened state, when the second unlocked state of the second locking element 82 is maintained, the first locked state of the first locking element 81 is maintained. Here, the lid mechanism 1 according to the embodiment includes the flap element 9. As described above, when the lid 2 is in the first opened state, the second flap element 9b can effectively restrict the state of the second locking element 82 from changing from the second unlocked state to the second locked state. In other words, when the lid 2 is in the first opened state, the second flap element 9b can effectively maintain the second unlocked state.

In the lid mechanism 1 according to the embodiment, the transmission rod 83 and the second flap element 9b can effectively restrict the state of the first locking element 81, which functions as a pivot shaft in the first opened state, from changing from the first locked state to the first unlocked state. Thus, the pivot shaft can be effectively prevented from separating from the front base portion 31.

In addition, in the first opened state of the lid 2, even in a case where the box contact portion 91a of the second flap element 9b is pressed by mistake such that the state of the second locking element 82 changes to the second locked state (the state where the tip of each of the second sub-rod 822 and the second main rod 821 protrudes from the lid 2), the second flap element 9b can change the state of the second locking element 82 to the second unlocked state and maintain the second unlocked state as described above immediately after the misoperation is canceled. When the second locking element 82 is in the second unlocked state, the first locking element 81 is in the first locked state. Thus, in the lid mechanism 1 according to the embodiment including the flap element 9, the function of the transmission rod 83 of preventing the separation of the lid 2 (the function of preventing the misoperation) can be more effectively exhibited.

The change of the state of the lid 2 from the first opened state to the closed state will be described with reference to FIGS. 2 and 4. First, the operator presses the lid 2, in which the arm portion 5 and the lid main body 4 are integrated, against the biasing force of the first arm spring 61. As a result, the lid 2 pivots until the opening of the storage portion 12 is shielded from the interior of the vehicle. Finally, the state of the lid 2 changes from the first opened state to the closed state, the restriction by the second flap element 9b is released, and the state of the second locking element 82 changes from the second unlocked state to the second locked state.

When the state of the lid 2 changes from the first opened state to the closed state, the second flap element 9b provided on the front right side of the lid main body 4 moves close to the front base portion 31. In the first opened state, the flap main body 91 of the second flap element 9b is disposed to be inclined in a state where the rod contact portion 91b moves up and the box contact portion 91*a* moves down. At this time, the second flap element 9*b* maintains the second unlocked state of the second locking element 82. As a result, the transmission rod 83 restricts the state of the first locking element 81 from changing from the first locked state to the first unlocked state.

When the lid 2 in the above-described state pivots to a predetermined position to be the closed state, the box contact portion 91*a* comes into contact with the front base portion 31. Next, as the lid 2 pivots to be the closed state, the box contact portion 91*a* is gradually pressed up to the front base portion 31. On the other hand, by the box contact portion 91*a* being pressed up, the rod contact portion 91*b* that is pressed up according to the biasing force of the flap biasing member 92 is pressed down against the biasing force of the flap biasing member 92. That is, the flap main body 91 of the second flap element 9*b* pivots such that the box contact portion 91*a* moves up and the rod contact portion 91*b* moves down. This way, the pressing of the rod contact portion 91*b* to the flap contact portion 822*a* is released, and the second sub-rod 822 moves to the front side according to the biasing force of the second rod biasing member 824.

When the second sub-rod 822 moves to the front side, the second sub-rod 822 and the second main rod 821 move in a direction away from each other. When the change of the lid 2 to the closed state is completed, the tip of the second sub-rod 822 protrudes to the front side of the lid main body 4 and engages with the front base portion 31, and the tip of the second main rod 821 protrudes from the arm portion 5 and engages with the rear base portion 32. That is, the state of the second locking element 82 changes to the second locked state.

As the second sub-rod 822 and the second main rod 821 move in a direction away from each other, the movement of the transmission rod 83 is allowed. When the second sub-rod 822 and the second main rod 821 move in a direction away from each other according to the biasing force of the second rod biasing member 824, the second synchronization element 823 rotates counterclockwise, and thus the transmission rod 83 supported by the second synchronization element 823 moves to the left side together with the counterclockwise rotation of the second synchronization element 823. When the transmission rod 83 moves to the left side, the transmission rod contact portion 84*a* deviates from an upstream side on the movement locus of the engaging protrusion 812*c* provided in the first sub-rod 812. Instead, the transmission rod engaging hole 84*b* faces the engaging protrusion 812*c*. This way, the engaging protrusion 812*c* can enter and leave the transmission rod engaging hole 84*b*. That is, at this time, the movement of the first sub-rod 812 is allowed, and the first sub-rod 812 and the first main rod 811 are movable in a direction toward each other. Therefore, the state of the first locking element 81 can change from the first locked state to the first unlocked state.

The change of the state of the lid 2 from the closed state to the second opened state will be described with reference to FIGS. 3 and 5. First, the state of the first locking element 81 is changed from the first locked state to the first unlocked state. That is, the operator presses the button 110*b* of the unlock switch 100 provided on the left side wall 11*a* of the box main body 11, and moves the button 110*b* in the right direction. As a result, through the same operation as that of the unlock switch 100 of the right side wall 11*b*, the front-side tip of the first sub-rod 812 is separated from the front base portion 31, and the rear-side tip of the first main rod 811 is separated from the arm portion 5. This way, the first locking element 81 enters into the first unlocked state.

When the first locking element 81 is in the first unlocked state, the front end of the second sub-rod 822 of the second locking element 82, which is provided on the right end side, and the second support shaft 7 functions as a pivot shaft, and the lid 2 including the lid main body 4 pivots in a direction in which the lid 2 is opened according to the biasing force of the second arm spring 71. This way, the state of the lid main body 4 changes from the closed state to the second opened state. In the second support shaft 7, the second damper 73 which is the same as the first damper 63 is provided. Therefore, as in the case of the pivoting of the lid 2 in the first opened state, the pivoting of the lid 2 in the second opened state can also be gently performed.

Even in the second opened state of the lid 2, the flap element 9 (the first flap element 9*a*) described above regarding the first opened state of the lid 2 is also provided to maintain the first unlocked state of the first locking element 81. Accordingly, even in the second opened state of the lid 2, the first unlocked state of the first locking element 81 is maintained by the first flap element 9*a*. On the other hand, as described below, in the second opened state of the lid 2, the transmission rod 83 restricts the state of the second locking element 82 from changing from the second locked state to the second unlocked state.

When the operator presses the button 110*b*, the state of the first locking element 81 changes from the first locked state to the first unlocked state, and the first sub-rod 812 and the first main rod 811 move in a direction toward each other against the biasing force of the first rod biasing member 814. When the first sub-rod 812 moves in a direction toward the first main rod 811, that is, in the rear direction, the engaging protrusion 812*c* provided in the first sub-rod 812 is inserted into the transmission rod engaging hole 84*b* in the transmission rod tip portion 84. This way, in the first unlocked state of the first locking element 81, the engaging protrusion 812*c* is inserted into the transmission rod engaging hole 84*b*.

In the second opened state of the lid 2, the first unlocked state of the first locking element 81 is maintained by the first flap element 9*a*. Therefore, even in the second opened state of the lid 2, each of the first main rod 811 and the first sub-rod 812 is stored in the lid main body 4. Thus, the same effect as that of the first opened state of the lid 2 is exhibited. In addition, since the first flap element 9*a* and the second flap element 9*b* have the same configuration, the effects thereof on the flap main body 91 against the misoperation are also the same.

In addition, the first flap element 9*a* restricts the movement of the first sub-rod 812 to the front side. Accordingly, in the second opened state of the lid 2, the state where the engaging protrusion 812*c* of the first sub-rod 812 is inserted into the transmission rod engaging hole 84*b* is maintained.

By inserting the engaging protrusion 812*c* into the transmission rod engaging hole 84*b*, the movement of the transmission rod 83 in the left-right direction is restricted. When the movement of the transmission rod 83 is restricted, the rotation of the second synchronization element 823 connected to the transmission rod 83 is also restricted. As a result, the movements of the second sub-rod 822 and the second main rod 821 are also restricted. This way, in the second opened state of the lid 2, the transmission rod 83 and the first flap element 9*a* restrict the state of the second locking element 82 from changing to the second unlocked state and maintain the second locked state. Accordingly, in the lid mechanism 1 according to the embodiment, the second locked state of the second locking element 82, which functions as a pivot shaft in the second opened state of the lid 2, can be effectively maintained. As a result, in the lid mechanism 1 according to the embodiment, the lid 2 can be effectively prevented from separating from the base portion 3 and the box main body 11.

The change of the state of the lid 2 from the second opened state to the closed state will be described with reference to FIGS. 3 and 5. First, the operator presses the lid main body 4 against the biasing force of the second arm spring 71. The lid main body 4 pivots until the opening of the storage portion 12 is shielded from the interior of the vehicle. Finally, the state of the lid 2 changes from the second opened state to the closed state, the first unlocked state of the first locking element 81 which is maintained by the first flap element 9$a$ is released, and the state of the first locking element 81 changes from the first unlocked state to the first locked state.

When the state of the lid 2 changes from the second opened state to the closed state, the first flap element 9$a$ provided on the front left end side of the lid main body 4 operates in the same manner as in the case where the state of the lid 2 changes from the first opened state to the closed state. That is, in the closed state of the lid 2, the restriction of the state of the first locking element 81 from changing from the first unlocked state to the first locked state by the first flap element 9$a$ is released, and the state of the first locking element 81 changes from the first unlocked state to the first locked state.

At this time, as the first sub-rod 812 and the first main rod 811 move in a direction away from each other, the movement of the transmission rod 83 is allowed. That is, the first sub-rod 812 and the first main rod 811 move in a direction away from each other against the biasing force of the first rod biasing member 814, and as the first sub-rod 812 moves to the front side, the engaging protrusion 812$c$ inserted into the transmission rod engaging hole 84$b$ is separated from the transmission rod engaging hole 84$b$. Thus, the engagement between the engaging protrusion 812$c$ and the transmission rod engaging hole 84$b$ is released, and the transmission rod 83 is movable to the right side. Accordingly, the second synchronization element 823 connected to the transmission rod 83 is rotatable, and the second sub-rod 822 and the second main rod 821 are also movable. As a result, the state of the second locking element 82 can change from the second locked state to the second unlocked state.

Hereinafter, the effect of the embodiment will be described. The lid mechanism 1 according to the embodiment includes the flap element 9. In the first opened state, that is, when the first locking element 81 is in the first locked state, the flap element 9 maintains the second unlocked state of the second locking element 82. In addition, in the second opened state, that is, when the second locking element 82 is in the second locked state, the flap element 9 maintains the first unlocked state of the first locking element 81. This way, when the lid 2 is in the first opened state or the second opened state, the flap element 9 restricts the movement of the rod such that the tip of the rod of one locking element 8 opposite to the other locking element 8 functioning as a pivot shaft does not protrude from the lid 2. Accordingly, when the state of the lid 2 changes from the first opened state or the second opened state to the closed state, the tip of the rod does not protrude from the lid 2, and the lid 2 can be reliably locked to the box main body. When the state of the lid 2 changes from the first opened state or the second opened state to the closed state, the generation of a contact sound which may occur due to contact between the tip of the rod and the box main body 11 can be suppressed.

Further, the pressing inclined surface 910$b$ is formed on the rod contact portion 91$b$ of the flap element 9, and the pressure receiving inclined surfaces 812$b$ and 822$b$ facing the pressing inclined surface 910$b$ are formed on the flap contact portions 812$a$ and 822$a$ of the rods 812 and 822, respectively. In other words, the pressing inclined surface 910$b$ and the pressure receiving inclined surfaces 812$b$ and 822$b$, which face each other and are inclined, are formed on the contact surfaces of the rod contact portion 91$b$ and the flap contact portions 812$a$ and 822$a$, respectively. Further, the biasing force of the flap biasing member 92 is higher than the biasing force of each of the first rod biasing member 814 and the second rod biasing member 824. As a result, in the first opened state or the second opened state of the lid 2, for example, even in a case where the unlocked state of the rod (the first unlocked state or the second unlocked state) which is maintained by the flap element 9 is released due to the misoperation of the operator such that the tip of the rod protrudes from the lid 2, the flap element 9 can store the tip of the rod in the lid 2 immediately after the misoperation is canceled. Accordingly, the lid mechanism 1 according to the embodiment has advantageous effects in that the storage box having superior operability can be realized, for example, even in a case where the misoperation of the operator occurs in the opened state of the lid 2 (in the first opened state or the second opened state).

In the lid mechanism 1 according to the embodiment, the button portion 110 of the unlock switch 100 is provided on each of the left and right side walls 11$a$ and 11$b$ of the box main body 11 instead of being provided in the lid 2. As a result, a parting line of the button portion 110 is not formed on the lid 2, and the appearance of the lid 2 looks nice. In addition, by removing the button portion 110 from the lid 2, the unlock switch 100 can be removed from the inside of the lid 2. As a result, the thickness of the lid 2 (the height in the up-down direction in the closed state of the lid 2) can be thinned. As described above, in the lid mechanism 1 according to the embodiment, the appearance of the lid 2 looks nice, and the thickness of the lid mechanism can be reduced.

In the lid mechanism 1 according to the embodiment, the transmission rod 83, which restricts the states of the first locking element 81 and the second locking element 82 from changing to the unlocked state at the same time is provided. The transmission rod 83 according to the embodiment is configured such that the right end side thereof is supported by the second synchronization element 823 and the left end side thereof can engage with the engaging protrusion 812$c$ provided in the first sub-rod 812. The transmission rod 83 is moved by the second synchronization element 823 in synchronization with a change in the state of the second locking element 82. This way, in the lid mechanism 1 according to the embodiment including the transmission rod 83 as means for preventing the misoperation, assembly properties are improved due to the simple configuration thereof. In the transmission rod 83 according to the embodiment, a cam mechanism using a coil spring which is well-known in the related art is not used as means for preventing the misoperation. Accordingly, rattling between components derived from the cam mechanism using a coil spring can be effectively suppressed.

In the lid mechanism 1 according to the embodiment, the rotating mechanism is adopted instead of a rack-and-pinion mechanism which is used as a synchronization element in the related art. That is, in the lid mechanism 1 according to the embodiment, the first synchronization element 813 of the first locking element 81 and the second synchronization element 823 of the second locking element 82 are rotating bodies as the rotating mechanisms. As a result, rattling caused by meshing of teeth can be effectively suppressed as compared to a structure of the related art in which a gear of the rack-and-pinion mechanism is used as the synchronization element. Accordingly, in the lid mechanism 1 according to the embodiment, the generation of abnormal noise due to rattling or the like can be effectively suppressed.

In the lid mechanism 1 according to the embodiment, the arm portion 5 is disposed on the rear end side of the lid main body 4, and the first support shaft 6 and the second support shaft 7 are disposed on both end portions of the arm portion 5 and the rear base portion 32, respectively. Therefore, the lid 2 including the lid main body 4 and the arm portion 5 pivots from the right end side with respect to the base portion 3, and the lid main body 4 pivots from the left end side with respect to the arm portion 5 and the base portion 3. Due to the arm portion 5, the lid 2 is openable alternatively from the left end side or the right end side. In the lid mechanism 1 according to the embodiment, only one arm portion is used unlike a double-opening type storage box of the related art in which two arm portions are provided on front and rear end sides of a lid. Therefore, the number of components can be reduced. In addition, by using only one arm portion 5, the space on the box main body 11 side required to be disposed with the arm portion 5 can be reduced. Therefore, the box capacity of the storage portion 12, which is provided in the box main body 11, and the opening area of the storage portion 12 can be sufficiently secured.

In the lid mechanism 1 according to the embodiment, the arm portion 5 is disposed only on the rear end side of the storage portion 12. That is, the arm portion is not present on the front end side of the storage portion 12. Accordingly, the appearance of the storage portion 12 on the front end side can be made to look nice. Thus, in a case where the lid is opened, the appearance of the storage portion 12 can also be made to look nice.

Hereinabove, the preferred embodiment of the invention has been described in detail with reference to the drawings. However, the invention is not limited to the above-described embodiment, and various modifications can be made within a range not departing from the scope of the invention.

For example, in the embodiment, the lid mechanism 1 is a double-opening type. However, the lid mechanism may be a single-opening type. The bolt rod is used as the locking element 8, but the invention is not limited thereto. For example, a locking element having another configuration which is well-known in the related art may also be used.

In the embodiment, the base portion 3 is attached to the box main body 11 and integrated therewith. However, the base portion 3 may be the box main body 11. In the embodiment, the lid 2 is supported by the front base portion 31 and the rear base portion 32. However, the lid 2 may be supported by any one of the front base portion 31 and the rear base portion 32.

In the embodiment, the arm portion 5 is disposed on the rear end side of the storage portion 12. However, the arm portion 5 may be disposed on the front end side of the storage portion 12. The first arm spring 61 and the second arm spring 71 are provided on both left and right end sides of the arm portion 5. However, the first arm spring 61 and the second arm spring 71 are not necessarily provided, and any one of the first arm spring 61 and the second arm spring 71 may be provided. The first arm spring 61 and the second arm spring 71 may be, for example, turnover springs which are biased in both opening and closing directions. The first damper 63 and the second damper 73 are provided on both left and right end sides of the arm portion 5. However, the first damper 63 and the second damper 73 are not necessarily provided. Further, the arm portion 5 is not necessarily provided.

Even in a case where each of the configurations of the embodiment is modified, or in a case where the modified configurations are combined, the effects of the invention can be exhibited. In the lid mechanism 1 according to the invention, the pressing inclined surface 910*b* is provided in the rod contact portion 91*b* of the flap main body 91. With another configuration in which the pressing inclined surface 910*b* is not provided in the rod contact portion 91*b*, the effects of the invention can be exhibited. That is, a pressing inclined surface including an inclined surface which faces the rod contact portion may be provided on the flap contact portion of the rod which can come into contact with the rod contact portion of the flap main body of the flap element. With the above-described configuration, the pressing of the rod contact portion can be converted into pressing in the moving direction of the rod by the pressing inclined surface.

The double-opening storage lid according to the invention can be expressed as follows.

According to a first aspect of the invention, there is provided a lid mechanism 1 including:

a box main body 11 that includes a storage portion 12 having an opening;

a lid 2 that is supported so as to pivot with respect to the box main body and a state of which changes between a closed state where the opening is closed and an opened state where the opening is opened;

a locking element 8 that includes rods 812, 822 and rod biasing members 814, 824 and locks the lid in the closed state to the box main body, the rod being provided in the lid, being changeable between a locked state where the rod engages with the box main body and an unlocked state where engagement between the rod and the box main body is released, and having pressure receiving inclined surfaces 812*b*, 822*b*, and the rod biasing member biasing the rod to enter into the locked state; and a flap element 9 that includes a flap main body 91 and a flap biasing member 92 and, in the opened state, restricts a state of the rod from changing from the unlocked state to the locked state, the flap main body being provided in the lid and including a rod contact portion 91*b*, which has a pressing inclined surface 910*b* capable of coming into contact with the pressure receiving inclined surface, and a box contact portion 91*a* which is capable of coming into contact with the box main body, and the flap biasing member biasing the flap main body in a direction in which the pressing inclined surface presses the pressure receiving inclined surface of the rod and having a higher biasing force than the rod biasing member, wherein:

when the state of the lid changes from the closed state to the opened state, the pressing inclined surface provided in the rod contact portion of the flap main body presses the pressure receiving inclined surface provided in the rod; and when the state of the lid changes from the opened state to the closed state, the box contact portion of the flap main body comes into contact with the box main body such that the pressing of the pressing inclined surface to the pressure receiving inclined surface is released.

According to a second aspect of the invention, there is provided the lid mechanism 1 according to the first aspect, wherein:

the rod includes main rods 811, 821, sub-rods 812, 822, and synchronization elements 813, 823 that synchronize movements of the main rod and the sub-rod in a direction in which the main rod and the sub-rod move toward or away from each other;

the main rod and the sub-rod move in the direction away from each other, and each of the main rod and the sub-rod engages with the box main body such that the rod enters into the locked state; and the main rod and the sub-rod move in the direction toward each other, and each of the main rod and the sub-rod is separated from the box main body such that the rod enters into the unlocked state.

According to a third aspect of the invention, there is provided the lid mechanism 1 according to the first aspect or the second aspect, wherein:

the lid is pivotable about a first end side from a second end side with respect to the box main body or is pivotable about the second end side from the first end side with respect to the box main body;

the locking element includes a first locking element 81 that is provided on the first end side and a second locking element 82 that is provided on the second end side;

the flap element includes a first flap element 9a that engages with the first locking element and a second flap element 9b that engages with the second locking element;

when the first locking element is in the unlocked state, the lid is pivotable about the second locking element and the first flap element restricts a state of the first locking element from changing from the unlocked state to the locked state; and when the second locking element is in the unlocked state, the lid is pivotable about the first locking element and the second flap element restricts a state of the second locking element from changing from the unlocked state to the locked state.

What is claimed is:

1. A lid mechanism comprising:
a box main body that includes a storage portion having an opening;
a lid that is supported so as to pivot with respect to the box main body and a state of which changes between a closed state where the opening is closed and an opened state where the opening is opened;
a locking element that includes a rod and a rod biasing member and locks the lid in the closed state to the box main body, the rod being provided in the lid, being changeable between a locked state where the rod engages with the box main body and an unlocked state where engagement between the rod and the box main body is released, and having a pressure receiving inclined surface, and the rod biasing member biasing the rod to enter into the locked state; and
a flap element that includes a flap main body and a flap biasing member and, in the opened state, restricts a state of the rod from changing from the unlocked state to the locked state, the flap main body being provided in the lid and including a rod contact portion, which has a pressing inclined surface configured to come into contact with the pressure receiving inclined surface, and a box contact portion which is configured to come into contact with the box main body, and the flap biasing member biasing the flap main body in a direction in which the pressing inclined surface presses the pressure receiving inclined surface of the rod and having a higher biasing force than the rod biasing member, wherein:
when the state of the lid changes from the closed state to the opened state, the pressing inclined surface provided in the rod contact portion of the flap main body presses the pressure receiving inclined surface provided in the rod; and
when the state of the lid changes from the opened state to the closed state, the box contact portion of the flap main body comes into contact with the box main body such that the pressing of the pressing inclined surface to the pressure receiving inclined surface is released.

2. The lid mechanism according to claim 1, wherein:
the rod includes a main rod, a sub-rod, and a synchronization element that synchronizes movements of the main rod and the sub-rod in a direction in which the main rod and the sub-rod move toward or away from each other;
the main rod and the sub-rod move in the direction away from each other, and each of the main rod and the sub-rod engages with the box main body such that the rod enters into the locked state; and
the main rod and the sub-rod move in the direction toward each other, and each of the main rod and the sub-rod is separated from the box main body such that the rod enters into the unlocked state.

3. The lid mechanism according to claim 1, wherein:
the lid is pivotable about a first end side from a second end side with respect to the box main body or is pivotable about the second end side from the first end side with respect to the box main body;
the locking element includes a first locking element that is provided on the first end side and a second locking element that is provided on the second end sidep;
the flap element includes a first flap element that engages with the first locking element and a second flap element that engages with the second locking element;
when the first locking element is in the unlocked state, the lid is pivotable about the second locking element and the first flap element restricts a state of the first locking element from changing from the unlocked state to the locked state; and
when the second locking element is in the unlocked state, the lid is pivotable about the first locking element and the second flap element restricts a state of the second locking element from changing from the unlocked state to the locked state.

4. The lid mechanism according to claim 2, wherein:
the lid is pivotable about a first end side from a second end side with respect to the box main body or is pivotable about the second end side from the first end side with respect to the box main body;
the locking element includes a first locking element that is provided on the first end side and a second locking element that is provided on the second end sidep;
the flap element includes a first flap element that engages with the first locking element and a second flap element that engages with the second locking element;
when the first locking element is in the unlocked state, the lid is pivotable about the second locking element and the first flap element restricts a state of the first locking element from changing from the unlocked state to the locked state; and
when the second locking element is in the unlocked state, the lid is pivotable about the first locking element and the second flap element restricts a state of the second locking element from changing from the unlocked state to the locked state.

* * * * *